United States Patent
Luharuka et al.

(10) Patent No.: US 10,514,301 B2
(45) Date of Patent: Dec. 24, 2019

(54) VISUAL AND THERMAL IMAGE RECOGNITION BASED PHM TECHNIQUE FOR WELLSITE

(71) Applicant: SCHLUMBERGER TECHNOLOGY CORPORATION, Sugar Land, TX (US)

(72) Inventors: Rajesh Luharuka, Katy, TX (US); Amit Bhatia, Houston, TX (US); Garud Bindiganavale Sridhar, Sugar Land, TX (US); Jonathan Wun Shiung Chong, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/316,208

(22) PCT Filed: Jun. 5, 2015

(86) PCT No.: PCT/US2015/034580
§ 371 (c)(1),
(2) Date: Dec. 5, 2016

(87) PCT Pub. No.: WO2015/188162
PCT Pub. Date: Dec. 10, 2015

(65) Prior Publication Data
US 2017/0322086 A1    Nov. 9, 2017

Related U.S. Application Data

(60) Provisional application No. 62/008,330, filed on Jun. 5, 2014.

(51) Int. Cl.
*G01J 5/00* (2006.01)
*G01J 5/02* (2006.01)
(Continued)

(52) U.S. Cl.
CPC ............ *G01J 5/0037* (2013.01); *E21B 41/00* (2013.01); *E21B 44/00* (2013.01); *G01J 5/025* (2013.01);
(Continued)

(58) Field of Classification Search
CPC .... G01J 5/0037; G01J 5/48; G01J 2005/0077; G05B 19/0425; E21B 41/00; E21B 44/00
See application file for complete search history.

(56) References Cited

U.S. PATENT DOCUMENTS

2004/0223533 A1    11/2004    Dishaw et al.
2008/0152508 A1    6/2008    Meza et al.
(Continued)

FOREIGN PATENT DOCUMENTS

WO    2013009715 A1    1/2013

OTHER PUBLICATIONS

Leinonen et al: "Combining thermal and visible imagery for estimating canopy temperature and identifying plant stress", J. of Experimental Botany, 2004.*
(Continued)

*Primary Examiner* — Ruiping Li

(57) ABSTRACT

A method for monitoring wellsite equipment may include producing a digital image and a thermal image of the wellsite equipment; identifying one or more equipment units in the digital image; overlaying the thermal image on the one or more identified equipment units in the digital image to thermally map the one or more identified equipment units; and analyzing temperature conditions of at least a first identified equipment unit.

20 Claims, 5 Drawing Sheets

(51) Int. Cl.
  *E21B 41/00* (2006.01)
  *E21B 44/00* (2006.01)
  *G01J 5/48* (2006.01)
  *G05B 19/042* (2006.01)
(52) U.S. Cl.
  CPC ............ *G01J 5/48* (2013.01); *G05B 19/0425* (2013.01); *G01J 2005/0077* (2013.01)

(56) References Cited

U.S. PATENT DOCUMENTS

2010/0245608 A1  9/2010  Trudeau et al.
2013/0114641 A1  5/2013  Sutton

OTHER PUBLICATIONS

International Search Report issued in International Patent Application No. PCT/US2015/034580 dated Sep. 9, 2015; 3 pages.
Written Opinion issued in International Patent Application No. PCT/US2015/034580 dated Sep. 9, 2015; 9 pages.
Office Action issued in Russian Patent Appl. No. 20160151194 dated Feb. 14, 2018; 10 pages (with English translation).
Decision on Grant issued in Russian Patent Appl. No. 20160151194 dated Jul. 2, 2018; 10 pages (with English translation).

\* cited by examiner

VISUAL AND THERMAL IMAGE RECOGNITION BASED PHM TECHNIQUE FOR WELLSITE

CROSS-REFERENCE TO RELATED APPLICATIONS

This application is 371 National Phase Application of International Patent Application No. PCT/US2015/034580, filed on Jun. 5, 2015, which claims priority to U.S. Provisional Patent Application No. 62/008,330, filed on Jun. 5, 2014, entitled "Visual and Thermal Image Recognition based PHM Technique for Wellsite." Both priority applications are hereby incorporated by reference in their entirety.

BACKGROUND

Downhole wellsite equipment may be used for various oilfield operations including, but are not limited to, well stimulation, wireline logging, measurement-while-drilling, logging-while-drilling, directional drilling, well construction, and hydraulic fracturing. Wellsite equipment may be subjected to extreme environments, including, for example, high pressures, high temperatures, and cyclical or changing environments.

For example, wellsite equipment used for oilfield operations may often include positive displacement pumps, sometimes referred to as reciprocating pumps, which may be used for pumping fluids into a wellbore and the surrounding reservoir. A reciprocating pump having multiple pump chambers that each receive a reciprocating plunger, which may be referred to as a multiplex pump, may be used in hydraulic fracturing, where a fluid, including a proppant, is pumped down a wellbore at a flow rate and pressure sufficient to be injected into a fracture. In some fracturing operations, a muliplex pump may be required to pump up to twenty barrels per minute at pressures up to 20,000 psi. Because pumps used for hydraulic fracturing applications may be very large, the pumps and other equipment for such use are frequently moved to the oilfield on semi-trailer trucks or the like. Multiple pumps, for example, up to 36 multiplex pumps, may be connected together along a common line at the well site to produce a pumping system for outputting the desired volume and pressure.

To monitor the health of wellsite equipment, sensors are often placed along areas of the equipment having relatively higher propensity for failure. For example, sensors are often placed on high pressure equipment, for example, in areas near multiplex pumps, and along pipes or other areas containing fluid flow. Sensors may measure flow rate of a fluid, temperature, and pressure, for example, to monitor and predict failures in the area in which the sensor is disposed. However, for large scale oilfield operations, such as in hydraulic fracturing operations, the number of sensors required to monitor the health of the entire system may go into the thousands, as well as require complex or coordinated analysis in incorporating results from each sensor to determine the health of the system.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for monitoring wellsite equipment that includes producing a digital image and a thermal image of the wellsite equipment; identifying one or more equipment units in the digital image; overlaying the thermal image on the one or more identified equipment units in the digital image to thermally map the one or more identified equipment units; and analyzing temperature conditions of at least a first identified equipment unit.

In another aspect, embodiments disclosed herein relate to a method for monitoring wellsite equipment that includes taking a thermal image of the wellsite equipment, the wellsite equipment comprising at least one equipment unit having at least one marker thereon; identifying the at least one equipment unit based on a location of the at least one marker in the thermal image; overlaying the thermal image onto a rendering of the at least one equipment unit, wherein the location of the at least one marker in the thermal image overlaps a correlating location on the at least one equipment unit in the rendering; and analyzing at least one condition of the at least one equipment unit.

In yet another aspect, embodiments disclosed herein relate to a system for determining a condition of wellsite equipment that includes a plurality of equipment units, each equipment unit having at least one marker thereon; at least one thermal imaging device positioned a distance from the plurality of equipment units; a computational device in communication with the at least one thermal imaging device, the computational device capable of identifying one or more of the equipment units in a thermal image generated from the at least one thermal imaging device based on a position of the at least one marker thereon and overlaying the one or more identified equipment units in the thermal image on a rendering of the one or more equipment units.

Other aspects and advantages of the invention will be apparent from the following description and the appended claims.

DETAILED DESCRIPTION

Figure 1:
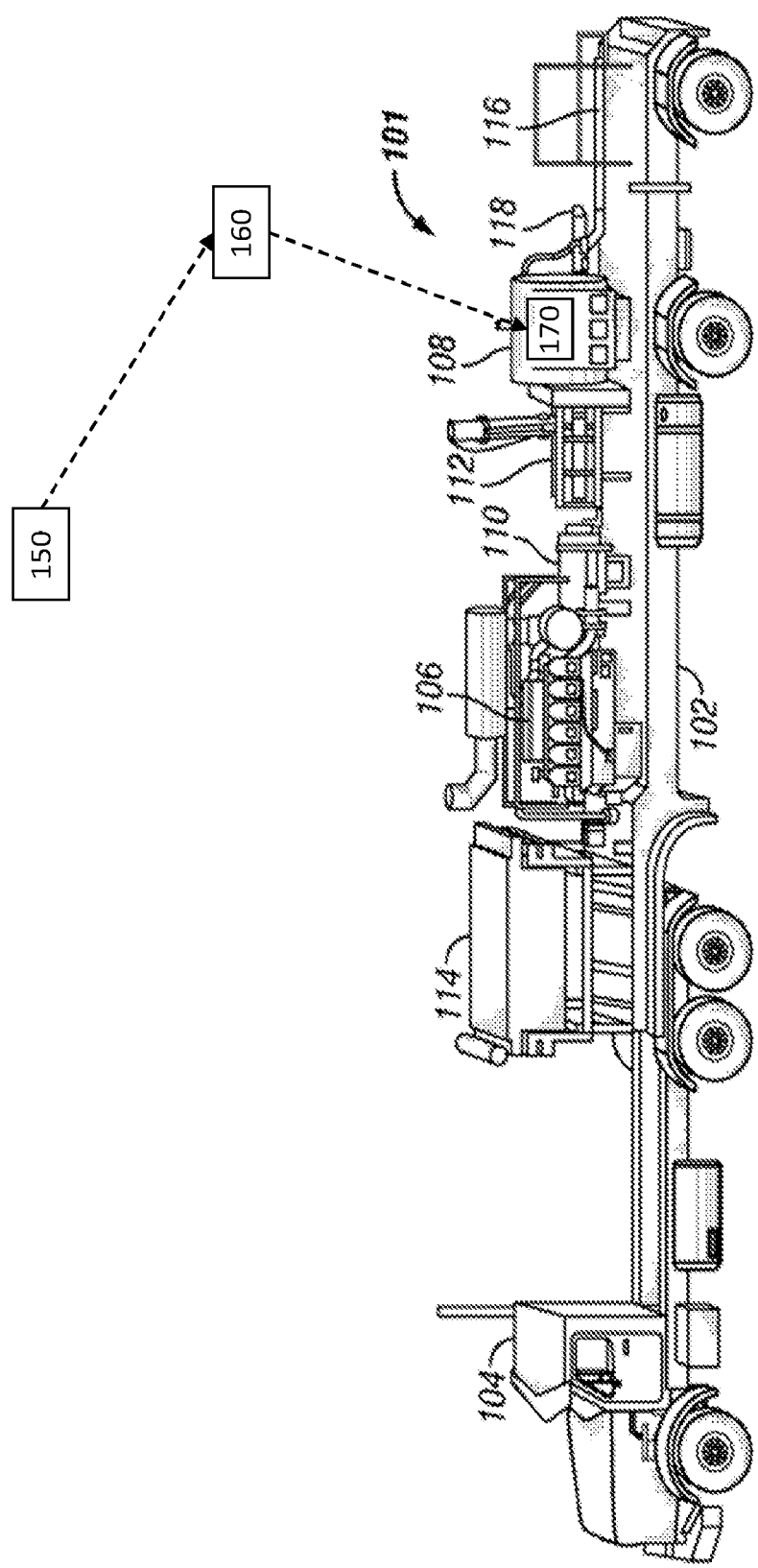
FIG. 1 shows a schematic view of system for monitoring an equipment unit according to embodiments of the present disclosure.

In the development of any embodiment of the present disclosure, numerous implementations and specific decisions may be made to achieve the developer's specific goals, such as compliance with system related and business related constraints, which may vary from one implementation to another. Moreover, it will be appreciated that such a development effort might be complex and time consuming but would nevertheless be a routine undertaking for those of ordinary skill in the art having the benefit of this disclosure.

In addition, particular features, structures, or characteristics described herein in connection with one embodiment may be implemented within other embodiments without departing from the spirit and scope of the invention. In the following description of embodiments, numerous specific details are set forth in order to provide a more thorough understanding of the invention, which may or may not be used in particular embodiments, depending on, for example the goals of the developer. In other instances, additional well-known features and/or components that have not been described in detail to avoid unnecessarily complicating the description may be used in embodiments of this disclosure.

It should be understood that throughout this specification, when a range is described as being useful, suitable or the like, it is intended that any and every value within the range, inclusive of recited end points, is to be considered as having been stated. Further, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. Thus, even if specific data points within the range, or even no data points within the range, are explicitly identified or referred to within the range, it is to be understood that any and all data points within the range are to be considered to have been specified, and that the inventors have possession of the entire range and all points within the range.

Embodiments described herein may relate generally to monitoring and/or analyzing one or more equipment units for a wellsite. Methods and systems disclosed herein may also be used in the monitoring and/or analyzing of equipment units for other industries, including but not limited to manufacturing assemblies for the food industry, automotive industry, electronic industry or other manufacturing settings that include equipment running at high temperatures and/or high pressures.

For example, some embodiments may relate to monitoring and analyzing equipment units at a hydraulic fracturing location. Whereas in previous approaches of monitoring equipment units at a fracturing location, individual sensors were used on every piece of the equipment (e.g., for about 20-30 deployed equipment units on a typical fracturing job, the number of sensors may go into the thousands), embodiments of the present disclosure may use a unified view of the entire fracturing location, and the use of thermal signatures emanating from the deployed equipment, for the monitoring and analyzing. The approach may use a combination of thermal and visible imaging techniques to achieve the monitoring and analyzing. This approach may also be used in applications where the equipment generates thermal signatures during use, for which it is feasible to do thermal and visual imaging, and may be applied to domains both within and outside the oil and gas industry.

Wellsite equipment used for oilfield operations such as hydraulic fracturing may include a plurality of equipment units that are transported to the wellsite and assembled together at the wellsite. As used herein, an "equipment unit" may refer to one or more components assembled together or may refer to a single component. For example, FIG. 1 shows an example of an equipment unit 101 that may be used for oilfield operations, where the equipment unit 101 is a plunger pump 101 that includes multiple components assembled together, including a prime mover 106 that drives a crankshaft through a transmission 110, a driveshaft 112 that drives one or more plungers toward and away from a chamber in the pump 108 in order to create pressure oscillations of high and low pressures in the chamber, a radiator 114 connected to the prime mover 106, an intake pipe 116 for receiving fluid at a low pressure, and a discharge pipe 118 for discharging fluid at a high pressure. The plunger pump 101 may be transported on a trailer 102 using a tractor 104.

A thermal imaging device 150 may be positioned a distance from the equipment unit 101. The thermal imaging device 150 may be a thermal infrared camera having an infrared sensor capable of detecting infrared light. Examples of a thermal imaging device may include but not limited to the FLIR GF300/320, Fluke Ti40FT IR Flex Cam, or other thermal imaging device having a detectable temperature range of −2° C. to 350° C. Other thermal imaging devices known in the art may be used with a broader or narrower temperature range suitable for the particular application, or perhaps with improved detector resolution and accuracy. According to some embodiments, a thermal imaging device may be a stereoscopic camera.

The thermal imaging device 150 may be in wireless or wired communication with a computational device 160 that may process a thermal image generated from the thermal imaging device 150. The computational device 160 may analyze and generate one or more conditions of the thermal image, including for example, identifying one or more components or equipment units in the thermal image, obtaining a temperature profile of the components or equipment units, and identifying equipment tracking information. Methods for identifying one or more components or equipment units in the thermal image according to embodiments of the present disclosure are described in more detail below.

The computational device 160 may further be in wired or wireless communication with a control unit 170 of the equipment unit 101. The control unit 170 may activate or control one or more parameters of the equipment unit 101 based on the analysis of the computational device 160. For example, a computational device may process a thermal image of an equipment unit, including generating a temperature profile of one or more components of the equipment unit, and analyze the temperature profile to diagnose fluid flow conditions, such as identifying hot spots due to excessive heat generation or identifying leaks. Upon diagnosing a problem or undesired change in fluid flow conditions, the computational device may send a signal to the control unit of the equipment unit to alter the fluid flow conditions, including for example, shutting off one or more components in the equipment unit, turning on one or more components in the equipment unit, such as an additional pump, a fan, or additional fluid circulation, or opening or closing one or more valves.

Figure 6:
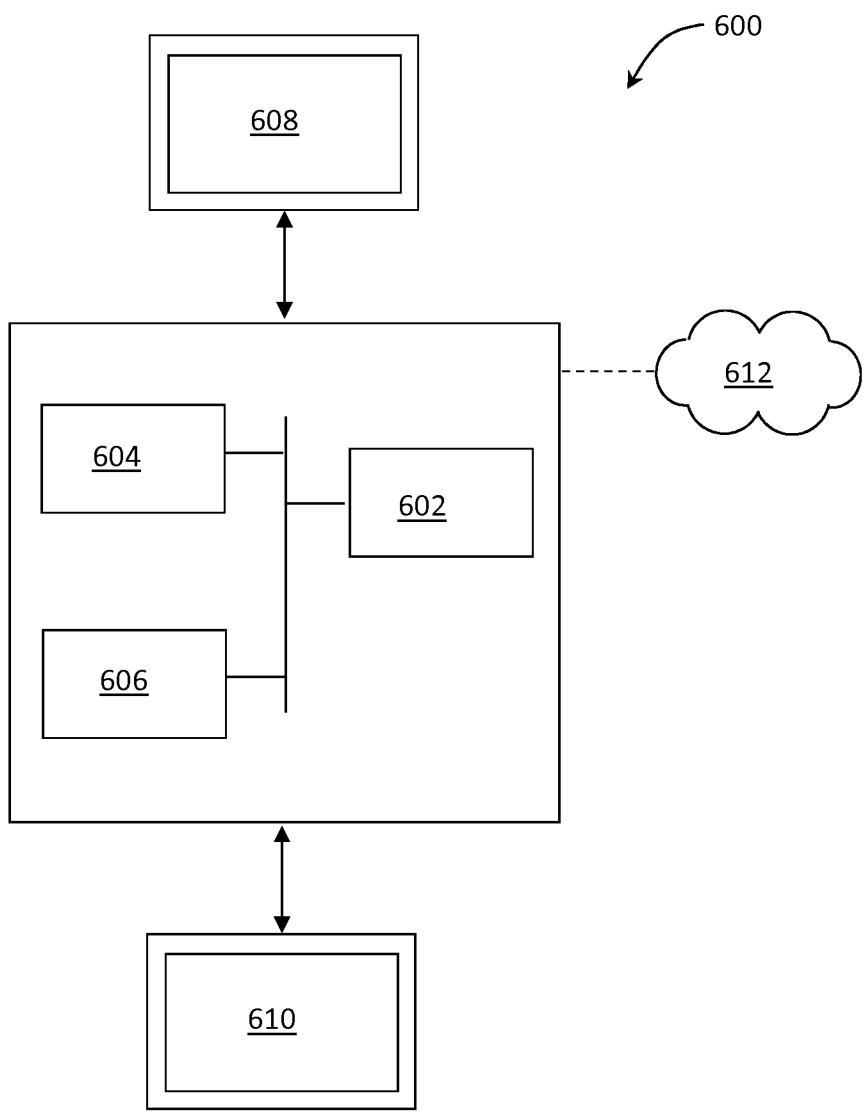
FIG. 6 shows a schematic diagram of a computational device according to embodiments of the present disclosure.

FIG. 6 shows an example of a computational device system 600 that includes one or more computer processor(s) 602, associated memory 604 (e.g., random access memory (RAM), cache memory, flash memory, etc.), one or more storage device(s) 606 (e.g., a hard disk, an optical drive such as a compact disk (CD) drive or digital versatile disk (DVD) drive, a flash memory stick, etc.), and numerous other elements and functionalities. The computer processor(s) 602 may be an integrated circuit for processing instructions. For example, the computer processor(s) may be one or more cores, or micro-cores of a processor. The computing system 600 may also include one or more input device(s) 610, such as a touchscreen, keyboard, mouse, microphone, touchpad, electronic pen, or any other type of input device. Further, the computing system 600 may include one or more output device(s) 608, such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system 600 may be connected to a network 612 (e.g., a local area network (LAN), a wide area network (WAN) such as the Internet, mobile network, or any other type of network) via a network interface connection (not shown). The input and output device(s) may be locally or remotely (e.g., via the network 612) connected to the computer processor(s) 602, memory 604, and storage device(s) 606. Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the technology.

Further, one or more elements of the computational device system 600 may be located at a remote location and connected to the other elements over a network 612. Further, embodiments of the technology may be implemented on a distributed system having a plurality of nodes, where each portion of the technology may be located on a different node within the distributed system. In one embodiment, the node corresponds to a distinct computing device. The node may correspond to a computer processor with associated physical memory. The node may correspond to a computer processor or micro-core of a computer processor with shared memory and/or resources.

In some embodiments, one or more components of the computational device system 600 may be in wired or wireless communication with one or more devices in separate units. For example, an imaging device (e.g., a thermal imaging device or a visual imaging device) may be in communication with computer processor(s) 602, memory 604 or storage device 606 of the computational device system 600, where the imaging device may send an image to the computational device system 600 for processing or storage. In some embodiments, the output(s) 608 of the computational device system 600 may be in communication with one or more control units of wellsite equipment.

According to embodiments of the present disclosure, a system for determining a condition of wellsite equipment may include monitoring a plurality of equipment units, and up to the entire wellsite location, using a unified view of the wellsite location. For example, referring now to FIG. 2, a system for determining a condition of wellsite equipment may include a plurality of equipment units rigged up at or nearby a wellsite for performing an oilfield operation. A pumping system 200 is shown for pumping a fluid from a surface 118 of a well 120 to a wellbore 122 during the oilfield operation. In the example shown, the operation is a hydraulic fracturing operation, and hence the fluid pumped is a fracturing fluid. As shown, the pumping system 200 may include a plurality of water tanks 221, which feed water to a gel maker 223. The gel maker 223 combines water from the tanks 221 with a gelling agent to form a gel. The gel may then be sent to a blender 225 where it is mixed with a proppant from a proppant feeder 227 to form a fracturing fluid. The gelling agent may increase the viscosity of the fracturing fluid and allow the proppant to be suspended in the fracturing fluid. It may also act as a friction reducing agent to allow higher pump rates with less frictional pressure.

The fracturing fluid may then be pumped at low pressure (for example, about 60 to 120 psi) from the blender 225 to a plurality of plunger pumps 201 as shown by solid lines 212. The plunger pumps 201 may have the same or similar configuration as the plunger pump 101 shown in FIG. 1, or the plunger pumps 201 may have a different configuration from the plunger pump 101 shown in FIG. 1. Each plunger pump 201 may receive fracturing fluid at a low pressure and discharge it to a common manifold 210 (sometimes called a missile trailer or missile) at a high pressure as shown by dashed lines 214. The missile 210 may then direct the fracturing fluid from the plunger pumps 201 to the wellbore 122 as shown by solid line 215.

The amount of hydraulic horsepower needed from the pumping system in order to carry out the fracturing operation may be determined based on an estimate of the well pressure and the fracturing fluid flow rate required to create the desired fractures in the wellbore. For example, if it is estimated that the well pressure and the required flow rate are about 6000 psi (pounds per square inch) and about 68 BPM (Barrels Per Minute), then the pump system 200 would need to supply about 10,000 hydraulic horsepower to the fracturing fluid (i.e., 6000*68/40.8). If each plunger pump in a fracturing operation has an engine with a maximum rating of 2250 brake horsepower, which, when accounting for losses (typically about 3% for plunger pumps in hydraulic fracturing operations), allows each plunger pump to supply a maximum of about 2182 hydraulic horsepower to the fracturing fluid, a pump system would use at least five plunger pumps in order to supply 10,000 hydraulic horsepower to a fracturing fluid.

However, in order to prevent an overload of the transmission between the engine and the fluid end of each plunger pump, each plunger pump may be operated well under its maximum operating capacity. Operating pumps under their maximum operating capacity may also allow for one pump to fail and the remaining pumps to be run at a higher speed in order to make up for the absence of the failed pump. As such, in the example of a fracturing operation requiring 10,000 hydraulic horsepower, bringing ten plunger pumps to the wellsite may enable each pump engine to be operated at about 1030 brake horsepower (about half of its maximum) in order to supply 1000 hydraulic horsepower individually and 10,000 hydraulic horsepower collectively to the fracturing fluid. Although ten plunger pumps 201 are shown in the system of FIG. 2, more or less than ten pumps may be used in a fracturing operation, depending on, for example, the amount of hydraulic horsepower needed for the operation and the horsepower rating of the pumps.

In performing the example operation as described above at the required fracturing fluid delivery pressure ("pressure"), fracturing fluid delivery flow rate ("flow rate"), and hydraulic horsepower, numerous opportunities for equipment failure are present. Often, equipment failure results in a significant amount of heat generation. Examples of equipment failures that may result in a change in temperature include, but are not limited to: a priming loss on the fluid end of the positive displacement pump; a restriction in the lubrication system flowing to the bearings; increased frictional forces; degraded seals of the plunger, cross-head, and the like; the presence of impurities in the lubricant; or leakage in the piping system. Early diagnosis of these failures may prevent or reduce the incidence of significant damage to equipment and other undesirable events, such as environmental spillage.

Figure 2:
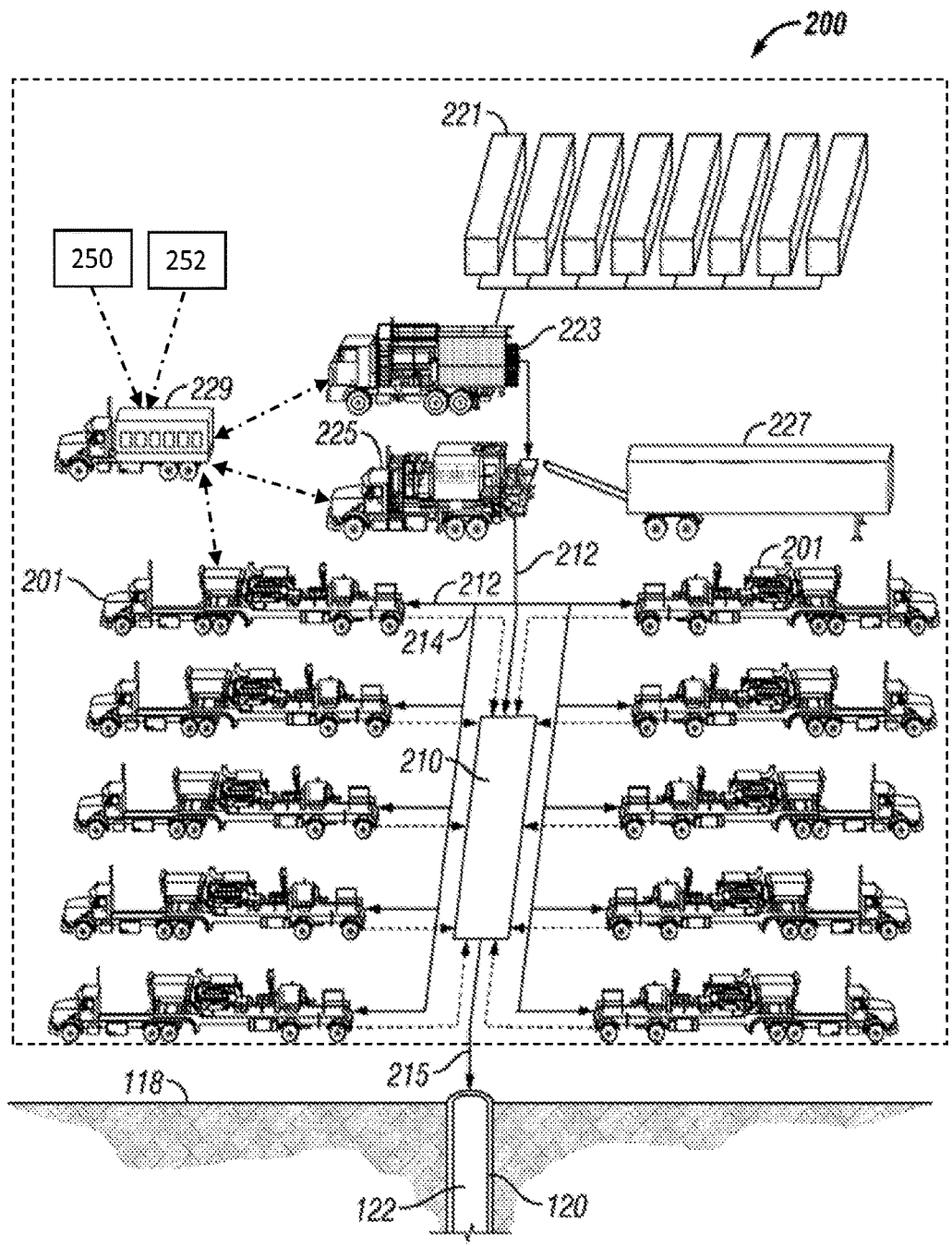
FIG. 2 shows a schematic view of an oilfield operation according to embodiments of the present disclosure.

Referring still to FIG. 2, at least one thermal imaging device 250 may be positioned a distance from the plurality of equipment units. For example, a thermal imaging device 250 may be mounted to the top of a silo or other support structure where the thermal imaging device may be at least 20 feet away from the nearest equipment unit, at least 40 feet away from the nearest equipment unit, or at least 60 feet away from the nearest equipment unit. In some embodiments, a thermal imaging device may be less than 20 feet away from the nearest equipment unit. The distance between a thermal imaging device and the nearest equipment unit may vary depending on, for example, the type of thermal imaging device (e.g., the thermal imaging device's range), the size of the equipment unit targets, or the size of the set up wellsite operation. The thermal imaging device 250 may take one or more thermal images of one or more equipment units, which show differences in temperature, or a temperature profile, of the equipment units captured in the thermal images. By capturing the temperature profile of the equipment units, increased amounts of heat generation, such as from the examples of equipment failures provided above, may be shown in the thermal images generated from the thermal imaging device. Thermal images taken with the thermal imaging device 250 may then be analyzed using methods disclosed herein.

A computational device 229, which may be housed in a mobile unit or a stationary unit, may be in wired or wireless communication with the thermal imaging device 250. The computational device 229 may optionally be in communication with one or more equipment units (e.g., as shown in FIG. 2, plunger pumps 201, blender 225, and/or gel maker 223), in which case, the computational device 229 may also be employed to direct the pump system 200 for the duration of the fracturing operation (e.g., by sending signals to activate or shut down one or more pumps, to open or close valves, to alter a fluid flow rate, or to alter fluid compositions, for example, by altering the amount of gelling agent mixed with a fluid). The computational device 229 may be capable of identifying one or more of the equipment units in a thermal image generated from the at least one thermal imaging device according to embodiments of the present disclosure. Further, in some embodiments, the computational device 229 may be used to analyze thermal images taken with the thermal imaging device 250, and optionally, send signals to alter one or more parameters of an equipment unit in the pump system 200 based on the conditions determined from the analyzed thermal images. Methods of identifying and analyzing thermal images are described in more detail below.

For example, according to some embodiments of the present disclosure, object recognition in thermal images may be done in two steps. First the equipment unit level recognition may be conducted, and then once the equipment units are identified, the components of the equipment units may be identified. Equipment unit level recognition may be based on, for example, a particular layout of the equipment unit (e.g., comparing a position of the equipment unit to a standardized layout or "rig up" of the wellsite equipment); the geometry of the equipment unit; thermal imaging visualization (where the unique pattern on a thermal image is a characteristic of the equipment unit); and/or one or more optionally attached markers on the equipment unit. Identification of equipment units may be used to generate the process layout at a wellsite, such as equipment rig up, piping lengths, orientation, amount of inventory present, etc.

As mentioned above, equipment units may optionally have one or more markers attached thereon, where the markers may be used in identifying the equipment units and/or components of the equipment units, for example, based on the location, type and/or orientation of the markers. For example, according to some embodiments, a system for monitoring wellsite equipment may include a plurality of equipment units, each equipment unit having at least one marker thereon, at least one thermal imaging device positioned a distance from the plurality of equipment units, and a computational device in communication with the at least one thermal imaging device, where the computational device is capable of identifying one or more of the equipment units in a thermal image generated from the at least one thermal imaging device based on a position of the at least one marker thereon and overlaying the one or more identified equipment units in the thermal image on a rendering of the one or more equipment units.

One or more markers may be attached at a reference point on an equipment unit or on one or more components of an equipment unit and can be tracked. A marker may be active, such as an infrared emitter, or may be passive, such as a coating of a retroreflective material. Examples of infrared emitters include light emitting diodes (LEDs) and other diode types. Examples of retroreflective material may include paint with glass beads dispersed throughout or other material having a property of total internal reflection. Other markers may be physical identifiers, such as an object having a unique or distinguishable shape and size. In some embodiments, multiple markers may be used on a component or on an equipment unit, which may improve the confidence level in recognition of the component or equipment unit and may help in instances where occlusion is an issue from viewing the component or equipment unit from a certain vantage point. Further, in some embodiments, unique markers may be used as identifiers or tags on particular equipment units and/or components (e.g., piping sections, joints, etc.) to allow the tracking of the lifecycle and usage of the equipment.

Figure 3:
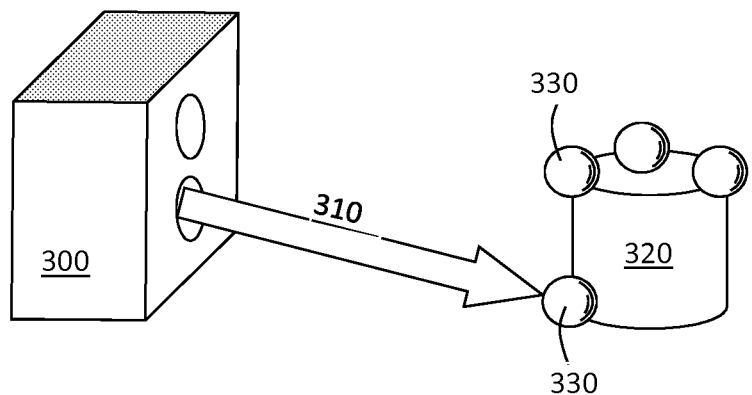
FIG. 3 shows a schematic view of a method for identifying an object according to embodiments of the present disclosure.

FIG. 3 shows an example of a tracking system used to detect markers and identify the equipment on which the markers are disposed based on the detection of the markers. As shown, a camera 300 may emit an infrared flash 310 towards an equipment target 320 (e.g., an equipment unit or a component of an equipment unit) having a plurality of markers 330 thereon. The markers 330 may reflect most of the infrared light (reflected light represented by 315) back to a sensor built into the camera 300. A computational device may be used to run image processing algorithms to calculate the shape of the equipment target 320 on which the markers 330 are attached. In the embodiment shown, the markers 330 are spherical with a retroreflective coating thereon. However, other marker types, such as those described herein, may be used. The camera 300 may be a thermal imaging device (e.g., the thermal imaging device 250 shown in FIG. 2) used for taking thermal images of wellsite equipment. In some embodiments, different camera/sensor types and/or different marker types may be used to identify an equipment unit and/or a component of an equipment unit.

Figure 4:
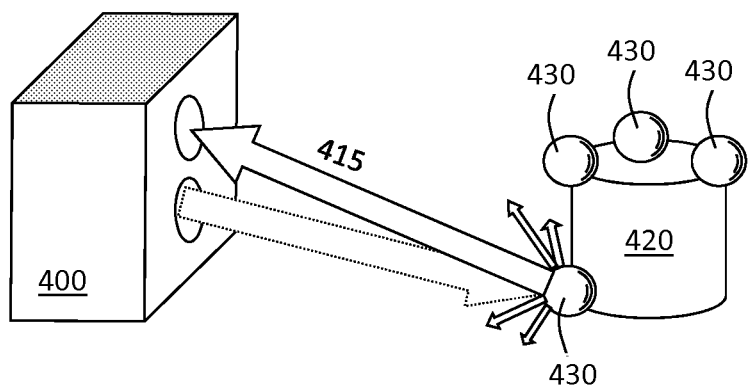
FIG. 4 shows a schematic view of a method for identifying an object according to embodiments of the present disclosure.

FIG. 4 shows an example of a thermal imaging device 400 that may be used to detect markers and identify the equipment on which the markers are disposed based on the detection of the markers. As shown, the thermal imaging device 400 is a stereoscopic camera, where each camera of the thermal imaging device 400 emits an infrared light 410 towards an equipment target 420 (e.g., an equipment unit or a component of an equipment unit) having a plurality of markers 430 thereon. The markers 430 may reflect most of the infrared light back to a sensor built into the cameras 400. The use of a stereoscopic camera may assist in resolving the three dimensional coordinates of the equipment target 420 from the vantage point of the stereoscopic camera. A computational device may be used to run image processing algorithms to calculate the shape of the equipment target 420 on which the markers 430 are attached.

Once the position and orientation of markers on an equipment unit or component are determined using one or more thermal imaging devices, the positional information of the markers may be overlaid onto a rendering of the identified equipment unit or component. A rendering of an equipment unit may be generated, for example, using a computational model (e.g., using computer-aided design software) to model the equipment unit or using a visual imaging device such as a digital camera to capture an image of the equipment unit.

For example, according to some embodiments, a system for monitoring wellsite equipment may include a plurality of equipment units, each equipment unit having at least one marker thereon, at least one thermal imaging device positioned a distance from the plurality of equipment units, at least one visual imaging device positioned proximate to the at least one thermal imaging device, and a computational device in communication with the at least one thermal imaging device and the at least one visual imaging device. The computational device may be capable of identifying one or more of the equipment units in a thermal image generated from the at least one thermal imaging device based on a position of the markers thereon and overlaying the one or more identified equipment units in the thermal image on a rendering of the one or more equipment units generated from the visual imaging device.

Referring again to FIG. 2, FIG. 2 shows an example of a system including a visual imaging device 252 proximate to a thermal imaging device 250, where the visual imaging device 252 may be used to produce the rendering of the equipment unit(s) identified in a thermal image taken with the thermal imaging device 250. In the embodiment shown, the visual imaging device 252 is a separate component from the thermal imaging device 250, where the visual imaging device 252 and thermal imaging device 250 are positioned proximate to each other to provide images generated from similar vantage points. According to embodiments of the present disclosure, positioning the visual imaging device 252 "proximate to" the thermal imaging device 250 may include positioning the visual imaging device 252 and thermal imaging device 250 adjacent to (and contacting) each other, or may include spacing the visual imaging device 252 a distance apart from but near the thermal imaging device 250. For example, a visual imaging device may be positioned proximate to a thermal imaging device, where the degree of separation relative to an equipment target (i.e., the angle formed between a line from the visual imaging device to an equipment target and a line from the thermal imaging device to the equipment target) may range from less than 10 degrees, less than 5 degrees, less than 2 degrees, or less than 1 degree. The degree of separation between a thermal imaging device and visual imaging device may be outside the above range (e.g., 10 degrees or more); however, the greater the distance between the thermal imaging device and visual imaging device, the greater the difference in vantage points between the imaging devices, which may result in lower accuracy in overlaying produced images and extracting desired data based on the analysis of the overlaid images.

According to some embodiments, a digital image produced from a visual imaging device having a different vantage point from a thermal image produced from a thermal imaging device may be translated based on the difference in coordinate positions of the thermal imaging device and visual imaging device to replicate the same vantage point as that of the thermal image. Digital image translations may be done with computational programs, for example, using a computational device in communication with both the thermal imaging device and the visual imaging device.

In some embodiments, a thermal imaging device and a visual imaging device may be a single unit, where the components used in taking a thermal image and the components used in taking a visual image share the same housing.

As mentioned above, according to some embodiments, a rendering may be generated using a computational model (e.g., using computer-aided design software). The computer generated model of an equipment unit may be correlated to two dimensional information obtained from a thermal imaging device. For example, a thermal imaging device may capture a thermal image of at least one equipment unit having a plurality of markers thereon. Based on the position of the markers in the thermal image (and/or based on thermal visualization), equipment unit level recognition may be done to identify the equipment unit. A computer generated model of the equipment unit may then be correlated to the two dimensional information obtained from the thermal image, where the thermal image of the equipment unit is overlaid onto the computer generated model of the equipment unit. For connections where markers are impractical to be attached to (e.g., treating iron to wellhead), image processing methods may be utilized to identify those connections by association with the known three dimensional landscape of the major equipment.

In some embodiments, a stereoscopic thermal imaging device may be used to produce a stereoscopic thermal image of at least one equipment unit. The stereoscopic thermal image may then be overlaid onto a three dimensional computer generated model of the equipment unit(s) identified in the stereoscopic thermal image.

Overlaying a thermal image on a rendering of one or more identified equipment units in the thermal image, such as a digital image of the equipment units or a computer-generated model of the equipment units, may be used in a process for identifying the equipment units in a thermal image as well as for identifying particular components of the equipment units. Further, by overlaying a thermal image on a rendering of identified equipment units, the identified equipment units may be thermally mapped, where a temperature profile for particular components of the equipment units may be obtained. However, in some embodiments, a unique pattern in a thermal image may be a characteristic of a particular equipment unit or component (thermal imaging visualization), and thus, may be used instead of or in addition to overlaying the thermal image on a rendering of the equipment unit or component.

Figure 5:
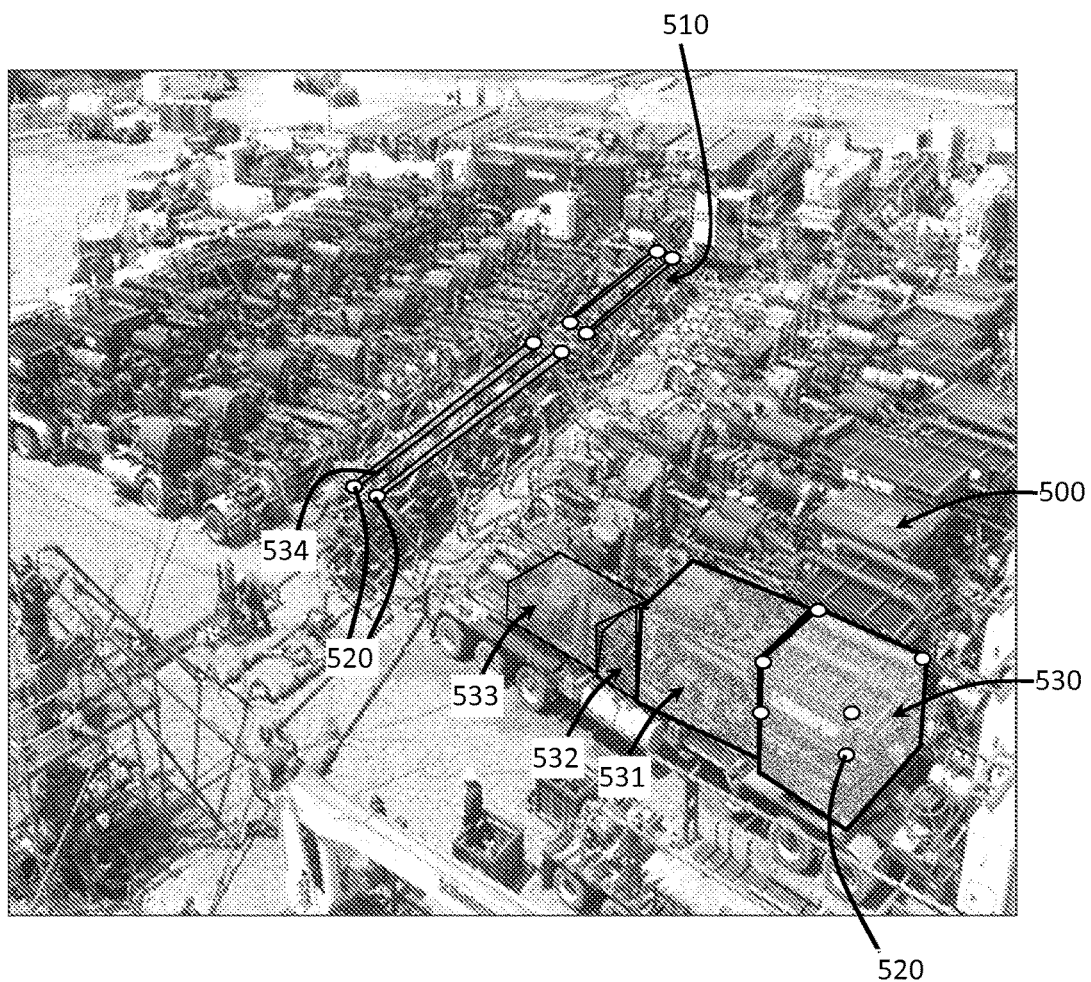
FIG. 5 shows a wellsite having a plurality of markers and simplified models of equipment units corresponding with the marker references according to embodiments of the present disclosure.

FIG. 5 shows an example of a wellsite rig up for a hydraulic fracturing operation. The wellsite equipment includes a plurality of pumping units 500 assembled around missile units 510. A plurality of redundant markers 520 may be disposed on the missile units 510 and on a pumping unit 500, which may be used to identify references for a computer-aided design model, which in turn may provide the position and orientation of the equipment units. Particularly, based on the position, spacing, etc. of the detected markers 520, the equipment units on which the markers are disposed may be identified. Computer-aided design models of the identified equipment units may be correlated to the location of the markers 520 to provide further position and orientation information of the equipment units. Simplified renderings of computer-aided design models are represented by reference numbers 530-534. Based on the markers 520 disposed on the pumping unit 500, a computer-aided design model 530 of a first component (the radiator component is shown in FIG. 5) of the pumping unit 500 is produced and oriented to correspond with the location of the markers 520. Based on the positioning of the first component model 530, and based on known information about the assembly of the pumping unit 500, a computer-aided design model 531 of a second component in the pumping unit 500 may be positioned to correspond with the known assembly of the pumping unit 500. Likewise, a computer-aided design model of a third component (532) and of a fourth component (533) may be positioned to correspond with the known assembly structure of the pumping unit 500. Based on the markers 520 disposed on the missile units 510, a computer-aided design model 534 of the missile units is produced and oriented to correspond with the location of the markers 520. Using the computer-aided design models 530-534 may provide more detailed information, for example, regarding positioning, particular component locations, etc., of the equipment units that are indicated using a few markers 520. A thermal image may then be overlaid onto the computer-aided design models to thermally map multiple equipment units at a time. Besides thermal information, other useful information can be retrieved/annotated for potential display, such as manufacturing information (e.g., model types, makes, etc.) and Prognostic Health Management ("PHM") and/or Condition Based Maintenance ("CBM") related information (e.g., exaggerated vibrations animations, and alarms).

In embodiments having equipment identified in a thermal image without the use of markers (e.g., based on the geometry of the equipment unit or based on thermal imaging visualization), the thermal image may be overlaid onto a rendering of the equipment unit.

According to some embodiments, one or more equipment units or components of equipment units may be identified using image processing of a digital image of the equipment units. Different image processing methods may be used to identify one or more equipment units or components in a digital image. For example, computational programs or algorithms may be used to scan and extract features from the digital image, where the features may be selected based on a training set of images labeled with two or more classifications. Some methods of image processing may include segmenting a digital image into non-overlapping regions of homogeneous color, shades or texture, detecting regions corresponding to a pre-defined model of one or more equipment units or components, and comparing surrounding regions with the pre-defined model of the equipment unit or component to determine if the detected regions are part of an image of the equipment unit or component. Other image processing methods known in the art may be used to identify one or more equipment units or components in a digital visual image.

Once object recognition is complete, and the identified objects are thermally mapped, the temperature profile of one or more components of an equipment unit may be obtained from the thermal image and tracked. Such a technique may allow equipment health to be tracked without the need to deploy thousands of targeted sensors, which can be expensive and unsustainable. For example, the temperature profile may show areas on one or more components that have increased amounts of heat being generated, which may indicate a heat-generation related failure or problem.

According to embodiments of the present disclosure, a method for monitoring wellsite equipment may include analyzing temperature conditions of at least one identified equipment unit using a thermal image of the identified equipment unit overlaid onto a rendering of the identified equipment unit. For example, in some embodiments, a method for monitoring wellsite equipment may include producing a digital image and a thermal image of the wellsite equipment, identifying one or more equipment units in the digital image, overlaying the thermal image on the one or more identified equipment units in the digital image to thermally map the one or more identified equipment units, and analyzing temperature conditions of at least a first identified equipment unit.

Analyzing a thermal image (e.g., a thermal image overlaid on a rending of an identified component or equipment unit or a thermal image having one or more components or equipment units identified by thermal imaging visualization) may include determining temperature values for discrete segments of the identified component or equipment unit. Generally, a component size may range from about 3 inches (7.62 cm) to 60 inches (152.4 cm) in its smallest direction. An example of a 3 inch feature is the bearings raceway in power ends. An example of 60 inches is the entire fluid end which may get very hot when a valve fails in that fluid end. The temperature values may be monitored at selected intervals to determine changes in the temperature values over a period of time. The temperature values may be displayed in a graph or chart over a desired period of time, may be processed through a computer-aided algorithm or program, and/or may be stored.

In some embodiments, analyzing a thermal image may include comparing the detected temperature values of identified components or equipment units with theoretically calculated temperature values of the identified components or equipment units. For example, a theoretical reference temperature may be calculated based on one or more standard operating parameters of the component or equipment unit. In some embodiments, analyzing a thermal image may include comparing the detected temperature values of identified components or equipment units with stored temperature values of the identified components or equipment units, such as from a database of measured temperature values of healthy operating components or equipment units.

In some embodiments, the temperature values may be compared with a preselected temperature value or with a preselected temperature range. For example, a preselected temperature value may include a maximum or minimum temperature value for one or more discrete segments, and a preselected temperature range may include a standardized or average operating temperature range. When the temperature value obtained through a thermal image is outside of a limit set by the preselected temperature value or range, at least one condition of the wellsite equipment may be altered to maintain a desired temperature of the component or equipment unit being analyzed. For example, if a temperature value of one or more discrete segments reaches a preselected maximum temperature value or goes outside a preselected temperature range, at least one condition of the wellsite equipment may be altered. Conditions of the wellsite equipment that may be altered to maintain a desired temperature or temperature range of one or more components may include, but is not limited to, altering a number of activated pumps, changing a composition of a fluid flowing through the one or more components, altering the speed or power output of an engine or motor, and/or replacing or repairing one or more components, e.g., one or more bearings or seals.

In one or more embodiments, the temperature conditions analyzed may indicate and be used to determine the path of fluid flow through an equipment unit (such as the rig up or piping system connecting two other equipment units). Such fluid flow may be used to diagnose for leakage, determine improper rigup or change in rigup, clogging inside the line, etc.

Altering at least one condition of the wellsite equipment may be automated or completed manually. For example, in some embodiments, upon determining a temperature value of one or more discrete segments is outside of a limit set by a preselected temperature value or range, a computational device may automatically send a signal to one or more control units of one or more equipment units to alter a condition, such as turning on an extra pump, turning off a pump, or others listed above.

In some embodiments, upon determining a temperature value of one or more discrete segments is outside of a limit set by a preselected temperature value or range, an analysis may be conducted to determine the cause in the change in temperature, where a solution to correct the cause of the temperature change may be manually carried out. The cause of the change in temperature may be determined via a manual analysis, for example by an operator or field inspector, or may be determined using a computer analysis program. For example, in some embodiments, when selected components of one or more equipment units are determined to have temperature values over a preselected maximum temperature, a computational device may be programmed to automatically send a signal to control units of the equipment units having above maximum temperature values to turn off one or more pumps or motors of the equipment units having above maximum temperature values (for example, where a temperature value going over a preselected maximum temperature value may indicate that a component in the equipment unit has failed and needs to be shut down), the computational device may automatically send a signal to turn on an additional pump or motor (for example, to activate a back-up component or equipment unit), and/or the computational device may automatically send a signal to alter at least one condition of the wellsite equipment to lower the temperature of the equipment unit having above maximum temperature values.

According to embodiments of the present disclosure, a method for monitoring wellsite equipment may include tracking inventory of the wellsite equipment. Inventory tracking of wellsite equipment may include identifying one or more equipment units at the wellsite and tracking the location and/or activation status (e.g., if the equipment unit is being used or is turned off) of the identified equipment units. The equipment units may be identified, for example, by overlaying a thermal image of the wellsite onto a digital image of the wellsite, by detecting one or more markers on the equipment units, by thermal imaging visualization and/or by other methods disclosed herein.

Using systems and methods disclosed herein may provide a non-intrusive way (that does not require installation of additional sensors on each piece of equipment) to monitor equipment at a wellsite. Further, the scope of health monitoring may not be limited to a single piece of equipment and, for example, may including monitoring all the equipment that is deployed for an operation. The object recognition and contextual understanding of the thermal-visible image overlay may leverage tools in both infrared thermography and also in computer vision and image processing.

Although only a few example embodiments have been described in detail above, those skilled in the art will readily appreciate that many modifications are possible in the example embodiments without materially departing from the scope of this disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words "means for" together with an associated function.

What is claimed is:

1. A method for monitoring mobile wellsite equipment, comprising:
   operating the mobile wellsite equipment;
   producing a digital image and a thermal image of the mobile wellsite equipment;
   identifying one or more equipment units in the digital image, wherein the one or more equipment units are identified based at least in part on a location of at least one marker attached to the one or more equipment units;
   overlaying the thermal image on the one or more identified equipment units in the digital image to thermally map the one or more identified equipment units;
   analyzing temperature conditions of at least a first identified equipment unit; and
   altering the operation of at least one of the one or more equipment units based at least in part on the analyzed temperature conditions.

2. The method of claim 1, wherein the thermal image is taken with a thermal imaging device and the digital image is taken with a visual imaging device, the thermal imaging device and the visual imaging device located a distance from the mobile wellsite equipment.

3. The method of claim 2, further comprising translating the digital image to a second perspective digital image based at least in part on a difference in coordinate positions of the thermal imaging device and the visual imaging device.

4. The method of claim 1, wherein analyzing comprises:
   determining temperature values for discrete segments of the first identified equipment unit; and
   monitoring changes in the temperature values over a period of time.

5. The method of claim 4, further comprising displaying the temperature values over the period of time in a graph.

6. The method of claim 4, wherein altering comprises further comprising:
   selecting a maximum temperature value for one or more discrete segments; and
   altering at least one condition of the mobile wellsite equipment upon determining the maximum temperature value.

7. The method of claim 6, wherein altering the at least one condition of the mobile wellsite equipment comprises altering a number of activated pumps.

8. The method of claim 6, wherein the altering the at least one condition of the mobile wellsite equipment is automated.

9. The method of claim 1, wherein the first identified equipment unit comprises a connection between two other equipment units.

10. The method of claim 1, wherein the temperature conditions are used to determine a path of fluid flow through the first identified equipment unit.

11. The method of claim 10, wherein the path of fluid flow is used to diagnose for leakage or determine improper rigup, change in rigup, or clogging inside the first identified equipment unit.

12. A method for monitoring mobile wellsite equipment, comprising:
   operating the mobile wellsite equipment;
   taking a thermal image of the mobile wellsite equipment, the mobile wellsite equipment comprising at least one equipment unit having at least one marker attached thereon;
   identifying the at least one equipment unit based at least in part on a location of the at least one marker in the thermal image;
   overlaying the thermal image onto a rendering of the at least one equipment unit, wherein the location of the at least one marker in the thermal image overlaps a correlating location on the at least one equipment unit in the rendering;
   analyzing at least one temperature condition of the at least one equipment unit; and
   altering the operation of at least one of the at least one equipment unit based at least in part on the analyzed at least one temperature condition.

13. The method of claim 12, wherein analyzing comprises determining temperature values for discrete segments of the at least one equipment unit.

14. The method of claim 12, wherein analyzing comprises comparing a position of the at least one equipment unit to a standardized layout of the mobile wellsite equipment.

15. The method of claim 12, wherein the at least one marker comprises a retroreflective material.

16. The method of claim 12, wherein the at least one marker comprises an infrared emitter.

17. The method of claim 12, wherein the rendering is a three dimensional computational model of the at least one equipment unit.

18. The method of claim 12, wherein the thermal image is taken using a stereoscopic camera.

19. The method of claim 12, wherein at least one of analyzing and altering is performed by a control unit of the at least one equipment unit.

20. The method of claim 12 wherein the at least one marker comprises a plurality of markers, and wherein the plurality of markers improves a confidence level in identifying the at least one equipment unit.

* * * * *